(12) United States Patent
Schmidt et al.

(10) Patent No.: US 7,605,329 B2
(45) Date of Patent: Oct. 20, 2009

(54) TERMINAL STRUCTURE

(75) Inventors: Frank Schmidt, Langenhagen (DE); Arnaud Allais, Hannover (DE); Pierre Mirebeau, Villebon sur Yvette (FR); Francois Ganhungu, Vieux-Reng (FR); Nicolas Lallouet, Saint Martin Boulogne (FR)

(73) Assignee: Nexans, Paris (FR)

( * ) Notice: Subject to any disclaimer, the term of this patent is extended or adjusted under 35 U.S.C. 154(b) by 723 days.

(21) Appl. No.: 11/149,451

(22) Filed: Jun. 9, 2005

(65) Prior Publication Data

US 2006/0011377 A1   Jan. 19, 2006

(30) Foreign Application Priority Data

Jul. 16, 2004   (DE) .................... 10 2004 034 494

(51) Int. Cl.
*H01B 12/00* (2006.01)
(52) U.S. Cl. ..................... 174/15.4; 505/230
(58) Field of Classification Search ............... 174/15.4, 174/15.5, 125.1; 505/230–232
See application file for complete search history.

(56) References Cited

U.S. PATENT DOCUMENTS

| | | | | |
|---|---|---|---|---|
| 5,574,001 | A * | 11/1996 | Ackermann et al. ......... | 505/231 |
| 6,118,068 | A | 9/2000 | Kelch et al. .................. | 174/28 |
| 7,094,973 | B2 * | 8/2006 | Ashibe et al. ............. | 174/125.1 |
| 7,151,225 | B2 * | 12/2006 | Fujikami .................. | 174/125.1 |
| 7,265,297 | B2 * | 9/2007 | Ashibe et al. ............. | 174/125.1 |
| 2003/0154727 | A1 | 8/2003 | Ashibe et al. ................. | 62/45.1 |
| 2004/0256143 | A1 | 12/2004 | Ashibe et al. ............. | 174/125.1 |

FOREIGN PATENT DOCUMENTS

| DE | 19603215 A1 | 8/1997 |
|---|---|---|
| DE | 19938304 C2 | 3/2001 |

OTHER PUBLICATIONS

Search Report—Jul. 27, 2004.

\* cited by examiner

*Primary Examiner*—Jeremy C Norris
(74) *Attorney, Agent, or Firm*—Sofer & Haroun, LLP

(57) ABSTRACT

A terminal structure (2) for a superconducting cable (1) is described. It consists of a conductor (2a) and an insulator (2b) that surrounds the conductor (2a), wherein the superconducting cable (1) has a core with a superconducting conductor (5) and a layer of insulation that surrounds the conductor (5), and wherein the core is arranged in such a way that it can move longitudinally in a cryostat. The conductor (2a) of the terminal structure (2) is electrically connected with the superconducting conductor (5) or with a normal conductor (6) that is connected with the superconducting conductor (5) by means of a tubular part (7) made of an electrically conductive material, wherein the superconducting conductor (5) or the normal conductor (6) can slide in the part (7) in the direction of the superconductor.

5 Claims, 2 Drawing Sheets

TERMINAL STRUCTURE

GOVERNMENT LICENSE RIGHTS

This invention was made with government support under contract No. DE-FC36-00GO13032 awarded by the Department of Energy (DOE). The government has certain rights in the invention.

RELATED APPLICATION

This application is related to and claims the benefit of priority from German Patent Application No. 10 2004 034 494.9, filed on Jul. 16, 2004, the entirety of which in incorporated herein by reference.

FIELD OF THE INVENTION

The invention concerns a terminal structure for a superconducting cable.

BACKGROUND

The ends of superconducting cables require devices by means of which current and voltage make the transition from the low temperature of the cable to ambient temperature.

In this regard, a problem arises when the conductor of the superconducting cable, which conductor is arranged inside a cryostat in such a way that it can move freely in the longitudinal direction, contracts during the cooling process to the temperature at which the superconducting material makes the transition to the superconducting state and also when the cable warms up to ambient temperature, and the conductor expands during this process.

EP 1 283 576 A1 describes a terminal structure for a superconducting cable, in which the end of the conductor of the superconducting cable opens in an electrically conductive bushing, which is rigidly connected by a pipe section with the conductor inside the terminal structure.

OBJECTS AND SUMMARY OF THE INVENTION

The objective of the invention is to find a solution which, while maintaining electrical contact, allows movement of the conductor of the superconducting cable or of a normal conductor connected with the end of the superconducting cable.

The essential advantage of the invention is that expensive alternative solutions to the problem can be avoided and that it is possible to go back to a commercially available product, namely, the tubular part. Another advantage of the invention is that the tubular part always guarantees contact, even in the case of radial expansion or contraction, due to its flexible ribs.

BRIEF DESCRIPTION OF THE DRAWINGS

The invention is explained in greater detail below with reference to the embodiments schematically illustrated in FIGS. 1 to 3.

DETAILED DESCRIPTION

Figure 1:
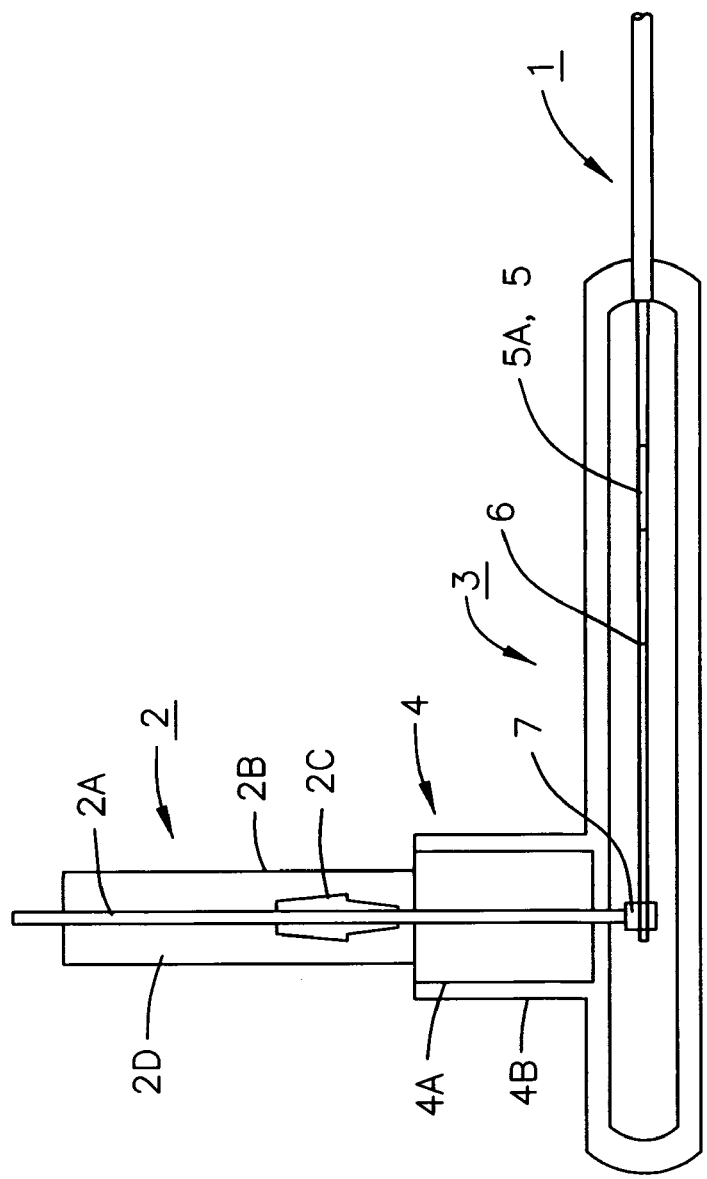
FIG. 1 shows a lateral section through a system for connecting a superconducting cable 1 with a terminal structure 2. The superconducting cable 1 is of a type that in itself is already well known and consists of a cable core and a cryostat surrounding the cable core.

The cable core consists of a conductor and a dielectric surrounding the conductor. A superconducting cable of this type is known from WO 02/15203.

The terminal structure 2 consists of a conductor 2a, an insulator 2b surrounding the conductor 2a, and a field control element 2c. It is advantageous for the interior 2d of the insulator 2b to be filled with insulating oil.

A housing 3, which is evacuated, surrounds the end of the cable and the junction between the conductor 5 of the cable 1 and the conductor 2a. A pipe socket 4, which concentrically surrounds the conductor 2a, is fitted on the housing 3. The pipe socket 4 is designed with two shells 4a and 4b, and the space between the two shells is filled with superinsulation and evacuated. The space between the conductor 2a and the inner shell 4a is filled with an insulating material, preferably a cellular plastic.

An especially advantageous design of a junction between the conductor of the cable and the conductor 2a will now be described.

The layer of insulation, which is not described in further detail, is removed from the end 5a of the superconducting conductor 5, which consists of a central element, e.g., a compressed cable of copper wires, and several strips of superconducting material wound onto the central element. The end 5a of the superconducting conductor 5 is connected with a copper pin or tube 6, e.g., by soldering. The ends of the individual strips of superconducting material are electrically connected with the surface of the tube or pin 6.

A tubular part 7, in whose opening the pin or tube 6 can slide longitudinally, is electrically connected to the lower end of the conductor 2a. The tubular part 7 has a large number of radially inwardly flexible and/or radially outwardly flexible ribs.

Figure 2:
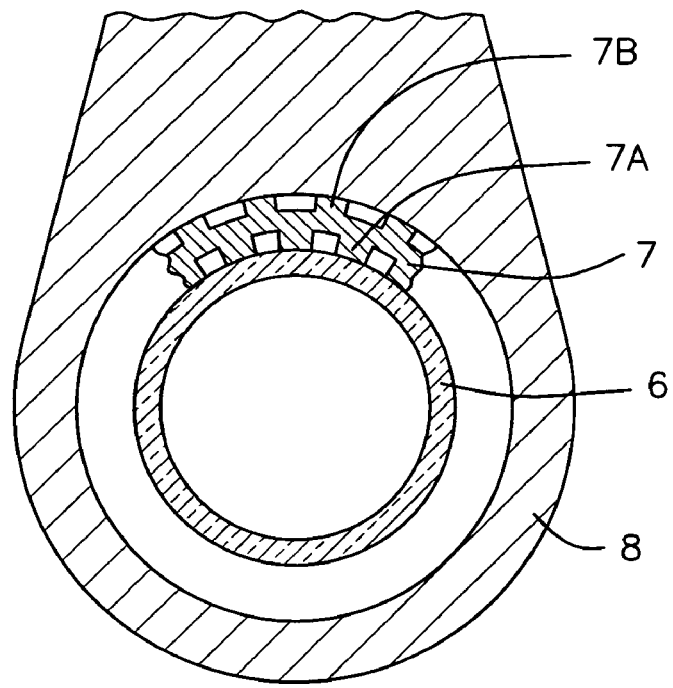
FIG. 2 shows a section through the region of the tubular part 7, which is shown only partly in section.

FIG. 2 shows a section through the region of the tubular part 7, which is shown only partly in section. The tube or pin 6 that is connected with the conductor 5 of the cable 1 is positioned inside the tubular part 7. The tubular part 7 is electrically connected with an adapter 8, which in turn is electrically connected with the conductor 2a. The tubular part 7 can have both inwardly projecting ribs 7a and outwardly projecting ribs 7b, which rest flexibly on the tube or pin 6 in the radially inward direction (ribs 7a) and rest flexibly in the drill hole of the adapter 8 in the radially outward direction (ribs 7b). The ribs 7a and 7b provide for constant contact between the tube or pin 6 and the adapter 8 even during a displacement of the tube or pin 6 in the longitudinal direction of the cable 1. The ribs 7a and 7b also absorb a radial dilation or contraction when the cable is taken out of operation or put into operation, i.e., when the cooling of the cable is switched off or switched on. It is advantageous for the tubular part 7 to be made of copper and for its surface to be coated with a thin layer of silver.

Figure 3:
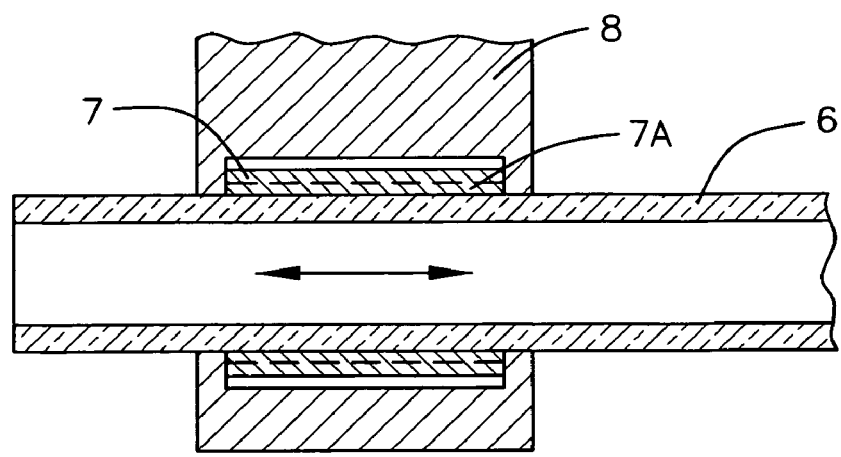
FIG. 3 shows a lateral section in the region of the tubular part.

FIG. 3 shows a lateral section in the region of the tubular part.

The tubular part 7 is fixed in the adapter. In this embodiment, the tubular part 7 has only inwardly projecting ribs 7a, which ensure electrical contact between the pin or the tube 6 and the tubular part 7 and thus an electrically conductive connection with the adapter 8 and the conductor 2a, including during the warming and cooling phase of the cable 1, during which the tube or pin 6 slides in the tubular part 7.

The invention claimed is:

1. Terminal structure for a superconducting cable comprising:
   a conductor;
   an insulator that surrounds the conductor; and
   a tubular part made of an electrically conductive material,
   where the superconducting cable has a core with a superconducting conductor and a layer of insulation that surrounds the superconducting conductor, said core being arranged in such a way that it can move longitudinally in a cryostat, wherein the conductor of the terminal structure is electrically connected with the superconducting conductor by means of said tubular part, such that the superconducting conductor can slide in the tubular part in the direction of the superconducting cable, said superconducting conductor having a normal conductor wherein the normal conductor is a tube, which is electrically connected to the end of the superconducting conductor, such that the tube is installed in the tubular part and can slide in the longitudinal direction of the cable.

2. Terminal structure in accordance with claim 1, wherein the normal conductor is a pin, which is electrically connected to the end of the superconducting conductor, such that the pin is installed in the tubular part and can slide in the longitudinal direction of the cable.

3. Terminal structure in accordance with claim 1, wherein the tubular part has a large number of radially flexible ribs on any one of its inner surface, its outer surface or both surfaces, such that the inwardly directed ribs rest on the surface of the superconducting conductor, which is made of an electrically conductive material.

4. Terminal structure in accordance with claim 1, wherein the tubular part has a large number of radially flexible ribs on any one of its inner surface, its outer surface or both surfaces, such that the inwardly directed ribs rest on the surface of the tube, which is made of an electrically conductive material.

5. Terminal structure in accordance with claim 2, wherein the tubular part has a large number of radially flexible ribs on any one of its inner surface, its outer surface or both surfaces, such that the inwardly directed ribs rest on the surface of the pin, which is made of an electrically conductive material.

* * * * *